Dec. 27, 1966    M. C. McCLURE ETAL    3,294,342
SERVICE FACILITIES AND EQUIPMENT

Filed Nov. 5, 1965    3 Sheets-Sheet 1

INVENTORS
MALCOLM C. McCLURE
RALPH E. McCLELLAN
GEORGE M. STEWART
K. G. BULLOCK
BY Hugh A Kirk
ATTORNEY Dec. 27, 1966   M. C. McCLURE ETAL   3,294,342
SERVICE FACILITIES AND EQUIPMENT
Filed Nov. 5, 1965   3 Sheets-Sheet 2

INVENTORS
MALCOLM C. McCLURE
RALPH E. McCLELLAN
GEORGE M. STEWART
K. G. BULLOCK
BY
*Hugh A. Kirk*
ATTORNEY

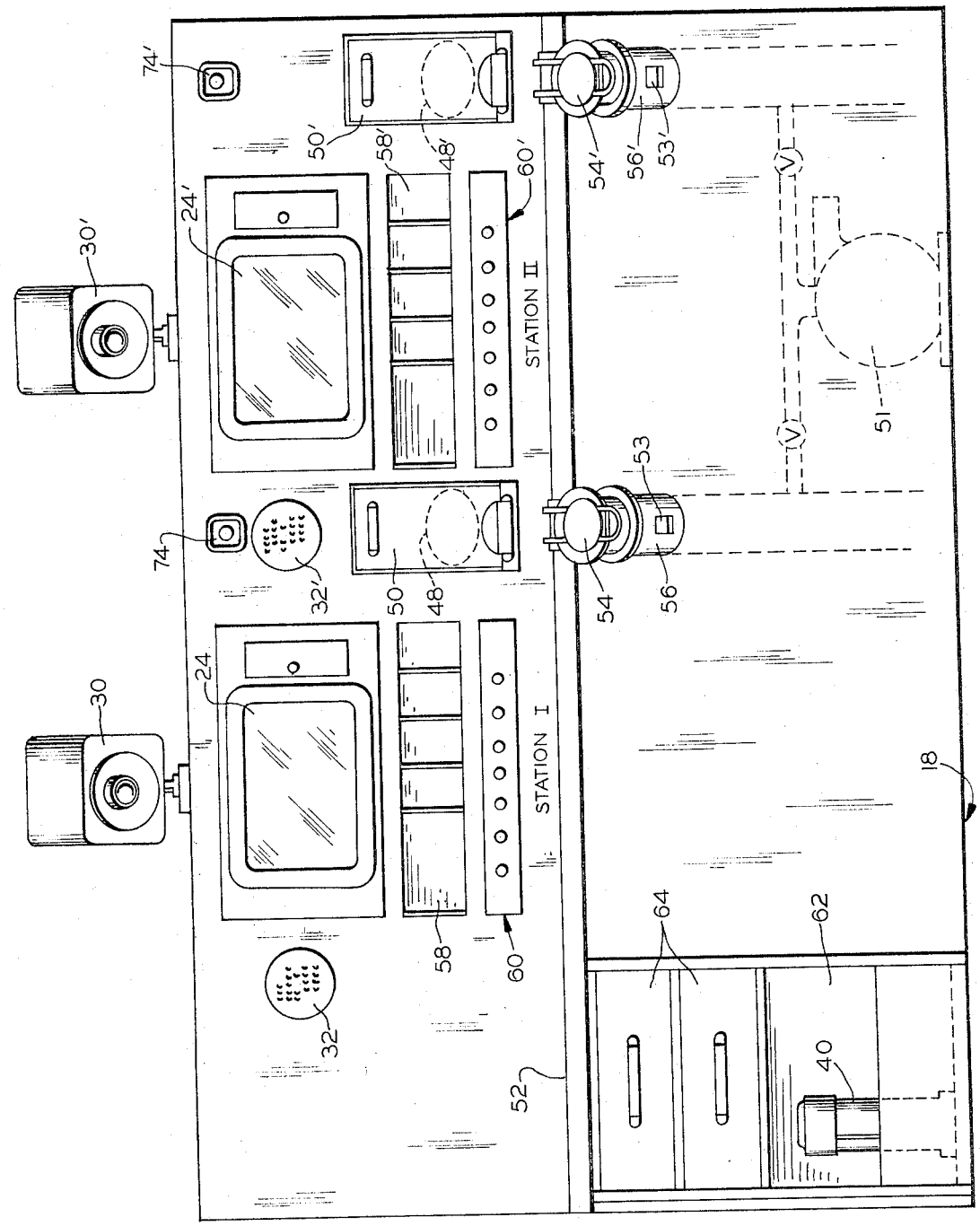

United States Patent Office 3,294,342
Patented Dec. 27, 1966

3,294,342
SERVICE FACILITIES AND EQUIPMENT
Malcolm C. McClure, Indianapolis, Ind., Ralph E. McClellan, Toledo, and George M. Stewart, Sylvania, Ohio, and K. G. Bullock, Lambertville, Mich., assignors to TV Bank Equipment Corporation, Toledo, Ohio, a corporation of Ohio
Filed Nov. 5, 1965, Ser. No. 506,457
13 Claims. (Cl. 243—2)

This application is a continuation-in-part application of Malcolm C. McClure et al. patent application Serial No. 119,524, filed June 26, 1961, for "Service Facilities and Equipment," now abandoned.

This invention relates to service facilities and equipment. More particularly, it deals with a closed circuit television and pneumatic tube dispatch system for the servicing of bank customers at a customer service-facility outside the bank.

Present facilities for servicing bank customers at a window outside a bank, a so-called "walk-up" service, have several disadvantages, and are somewhat limited with respect to the services which may be rendered. If the service window is mounted along a wall of the bank building, automobile parking often is inconvenient; moreover, the teller or operator who services such a window is removed from certain of the normal teller facilities, and thus the services which she may perform are somewhat limited.

A more remote customer facility which has been tried is a sort of a "service-island" remote from the bank building, and located in the bank parking area. This service-island arrangement does provide a better location from a parking and driver's convenience standpoint; but the teller, isolatedly stationed in such a service island, is so far removed from many of the teller facilities that the nature of services permitted by such an arrangement is ordinarily quite limited to more or less routine transactions, such as check-cashing, receiving deposits, and the like. Other transactions cannot be conveniently accomplished, and thus are not fully provided, such as accepting and posting mortgage note payments, check identification, preparing certified checks, and the like.

A further disadvantage, particularly with present service-island arrangement is that of the difficulty of providing maximum protection and security both for the teller in such an island and for the cash which must be kept at that remote station. Insurance is often available for such an arrangement only at added cost.

Moreover, particularly when either type of exterior service-facility is adapted for drive-in use, operational efficiency is relatively low. This is due, for one reason, to the fact that the customer's automobile blocks the service window for a time period before and after the actual transaction, for example, while the customer fills out deposit slips, pockets his money, and the like; and during this non-service time, the teller is often idle. It is not ordinarily convenient for the one teller to service more than one such window. Another reason for low efficiency is that the island-operator is so remote from other activities that she cannot ordinarily perform other duties during idle periods of island usage.

Accordingly, it is a general object of this invention to provide a simple, efficient, effective, economic, and practical exterior service facility, usable by banks, which overcomes many of the disadvantages just indicated above.

Another object of this invention is to provide new and advantageous facilities and equipment for conveniently providing complete banking facilities for servicing a bank customer at a customer facility exterior of and/or remote from the bank.

Another object is to provide such a novel facility which will improve the productivity of banking personnel by servicing more than one customer at a time without substantial loss of the personal contact with each of the customers, thus achieving good characteristics of identification, customer relations, and personal contact and attention.

Another object is to provide novel means for achieving advantages of a remote service window but with the need of no cash at the service-island, and with the teller located within the bank rather than isolated at the island itself, thus giving much greater security and with lower insurance rates.

A still further object of this invention is to provide such a system whereby the teller may change the angle of the television camera at a remote station to better view the customer and/or the hand movements of the customer at the remote station.

Another object is to provide in such a system, a carrier for a pneumatic tube which carrier may be removed from the system by the customer, opened, articles placed therein and/or removed, closed, and then when placed back into the system by the customer, the open door through which it is deposited or dropped is closed automatically and simultaneously the pneumatic system is started automatically.

A further object of this invention is to provide in such a system, means at the remote station for cushioning the final movements and stop of the carrier or capsule at one of its stations, including the directing of the capsule into a receptacle for presentation to a customer at the remote station, as well as means for indicating to the teller in the bank if the capsule is at the remote station when the door at the remote station to present the capsule has not been opened or is in its closed position.

In carrying out this invention in an illustrative embodiment, there is provided a teller station located within the bank, and a customer service-island exterior of the bank, such as in the bank parking area. The teller station and the customer station are inter-connected by a two-way closed-circuit television circuit, and by a two-way inter-communication system, and also by two pneumatic conveyor tubes for the two-way dispatch of material in a capsule between the two stations. The teller inside the bank has convenient access to all the normal teller facilities, and thus he or she can render substantially complete banking services; yet he or she remains in face-to-face visual and verbal contact with the customer, and can receive and send material to him or her, and also the teller can be servicing a second customer at another window, or perform other banking duties during non-service periods of a first customer. The customer can conveniently drive up to the service-island, and, while remaining in his or her automobile, can obtain the full services of an inside-the-bank teller, and the customer also can have full view of the complete transaction.

A control panel at the teller's station enables the teller to open and close a door containing a receptacle for the carrier or capsule at the remote station, which door retaining receptacle may be provided with cushioning means for the guiding and stopping of the capsule in this door receptacle. At this remote station there also may be provided sensing means in the pneumatic tube inside the door, into which the customer drops the capsule when it is to be returned to the teller, which sensing means causes the door to close automatically, as well as causes the pneumatic system to start the travel of the capsule to the teller inside the bank. Furthermore there may be provided photoelectric or other additional sensing means adjacent the receptacle in the door, when the door is in its closed position, for indicating to the teller whether or not the capsule is at that remote station.

The above mentioned and other features and objects of this invention and the manner of attaining them will become more apparent and the invention itself will be understood best by reference to the following description of an embodiment of the invention taken in conjunction with the accompanying drawings, wherein:

FIG. 5 is an elevation view illustrating the equipment at the inside-bank station for one teller to service two customer stations.

Figure 1:
FIG. 1 is a pictorial view illustrating the equipment at the customer station with a customer in an automobile thereat.

As illustrated in the drawings, this invention generally comprises a remote or drive-in service facility such as a drive-in bank service; and this invention is described with reference to such a service.

General features of this invention comprise an exterior or customer station 10 (FIG. 1) to which a customer 12 may approach in an automobile 14, and an interior or bank station 18 (FIG. 5) desirably located within the bank and operated by and serviced by a service operator 20 (shown by her television image in FIG. 1).

By means now to be described the service operator 20 from her position interior of the bank, can see, hear, receive material from, and transmit material to the outside customer 12. Likewise, the customer 12 in his car 14 at the customer station 10 exterior of the bank, can see, hear, receive material from, and transmit material to the service operator 20 at the bank station 18. Generally complete banking facilities may be effected, giving advantages such as have been pointed out above.

Means for effecting this communication, both visual and audible, and the transmission and reception of material between the customer and the service operator will be described in association with a description of a servicing of the customer.

As the customer 12 arrives at the customer station 10, he comes into range of a television camera 22 which by closed-circuit television causes his image to appear on a corresponding one of the television receivers 24 and 24', such as for Station I and II, at the operator station 18. Suitable controls, including one of the control knobs in the corresponding control panels 60 and 60' for Stations I and II (FIG. 5) and a remote-control camera-adjustment motor 26 (FIG. 2), permit the service operator to adjust the camera 22 at the customer's station 20 to the desired setting to see the customer and/or what he is doing with his hands and with the material carrying capsule 40. Illuminating lights 28 (see FIGS. 1 and 3) may be provided to give desired illumination of the customer in his automobile. Visual identification of the customer 12 is substantially as positive as if there was an actual face-to-face proximity of customer 12 and teller 20.

The customer 12 sees the service operator 20 by her television image 20 on the screen of the television receiver 29 at the customer station 10, her picture being taken by the camera 30 or 30' correspondingly for Station I or II at the operator station 18 inside the bank.

Verbal communication between the customer 12 and the operator 20 is provided by an inter-communication system shown as including a combination speaker and microphone unit 31 at the customer station 10, and a corresponding combination speaker and microphone unit 32 or 32' at the service station 18 for each corresponding customer station 10 which may be also controlled by a knob on the corresponding station panel 60 or 60' by the teller or operator 20. Through this system the operator 20 greets the customer 12; and the location of the speaker 31, adjacent to television receiver 29, directs the customer's attention to the television receiver 29 where he views the operator 20. The operator 20 may, if necessary, point visibly to certain features of the customer station 10, in explaining to him (12) the location of other facilities at the customer station.

One of these other facilities may be a storage drawer 34 immediately below the television receiver 29 at the customer station 10 conveniently accessible to the customer 12 in his automobile 14. This drawer 34 is desirably kept supplied with such items as blank checks, deposit slips, and the like. Such items, which have negligible intrinsic value, may be kept in quantity at the customer station; and if their supply happens to be exhausted, the teller 20 may send more out to the customer station by means of the capsule 40 yet to be described.

Figure 3:
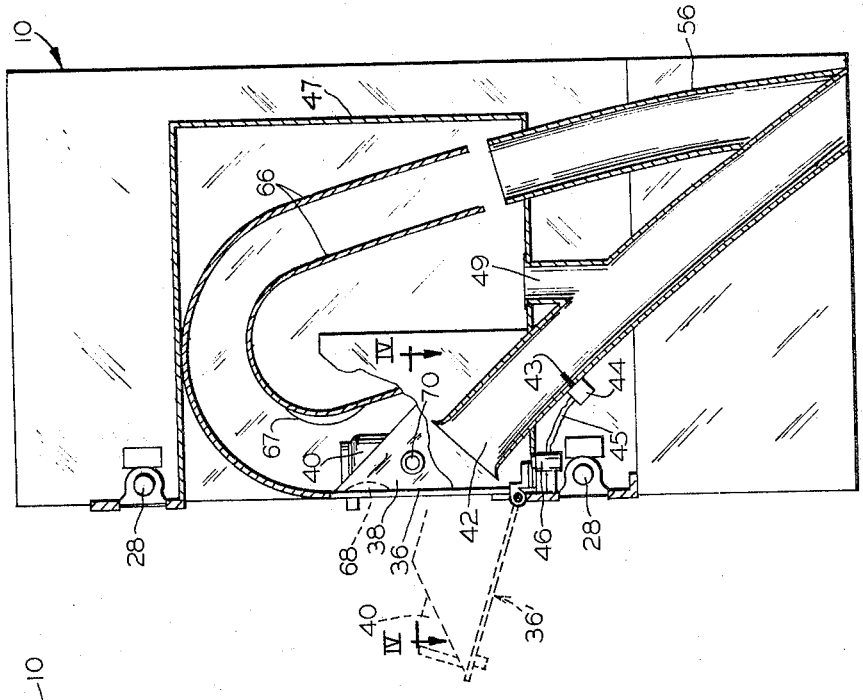
FIG. 3 is a sectional view of the customer station shown in FIG. 1 taken generally along the line III—III thereof, with parts of the capsule, its door receiving receptacle, and its enclosure therefor being broken away, and with the door in open position shown in dotted lines.
Figure 4:
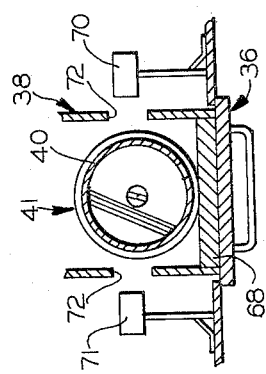
FIG. 4 is a sectional view of the customer station shown in FIG. 3 taken generally along the line IV—IV thereof, showing a capsule in its door receiving receptacle, and the sensing means for the capsule when in said receptacle.

Assuming now that the customer 12 has now prepared the proper document for his transaction, he may pull open a door 36, shown left-wardly of the lens of camera 22 (FIG. 1), to open it into a substantially horizontal position 36' shown in dotted lines in FIG. 3. The rear of the door 36 carries a capsule receiver box 38 which is of a size to accommodate a hollow cartridge or capsule 40 (FIGS. 3 and 4). With the door 36 in its open and horizontal position 36', the capsule 40 is conveniently accessible to the customer 12.

The customer 12 then removes the capsule 40 from the door box 38, opens it such as by pressing in on spring urged catch for releasing a spring hinged side 41 of the capsule 40 (see FIGURE 4), and inserts in it the documents related to the transaction, then closes side 41 of the capsule 40. The customer 12 then drops the capsule 40 into the open mouth of a transmisison tube 42. The mouth or dispatching end of tube 42 is shown as inside the customer station 10, but it is exposed while the door 36 is in its open position 36'. The transmission tube 42 is shown as having an initial portion having a downward slope; and thus the capsule 40 begins its journey by the force of gravity.

Along the initial portion of transmission tube 42, and as shown a few inches from the mouth thereof, there is provided a sensing or actuating switch 44 (see FIG. 3) which may have a movable plunger 43 extending into the path of a capsule 40. As a capsule 40 passes the switch 44, it moves the movable switch plunger 43 thereof to an operating position which energizes an electric circuit 45 to activate a door-closing solenoid 46, which solenoid automatically closes the door 36. This sensing switch and/or solenoid 46 also may activate the pneumatic means 51 to cause the capsule 40 to move through the length of the transmission tube 42 to the other tube end 48 at the operator or teller station 18 (FIG. 5), which tube end 48 is shown as located behind a door 50 or 50' for the corresponding Station I or II, respectively, at the operator station 18. A branch air duct 49 (FIG. 3) connects the transmission tube 42 with the interior closed portion or chamber 47 of the customer station 10, to assist in the pneumatic operation of the system, such as providing suction through the portion 49 to the outlet of the other transmission tube 56.

As the operator or teller 20 at the bank station (FIG. 5) notes reception of a capsule 40 at the corresponding Station I or II, door 50 or 50' location, the operator then opens that door 50 or 50', removes the capsule 40, places the capsule on a service shelf 52, and examines the contents of the capsule. In a routine transaction, in which the contents are proper in all respects, the operator 20 will then perform the necessary servicing duties while she is standing or is seated at the operator station 18. However, because this operator station 18 is located in the bank, she can conveniently communicate with other bank officials if the situation seems to warrant it, or utilize other interior-facilities conveniently accessible to her inside-the-bank location.

After performing the requisite servicing, the operator 20 places the material to be given or returned to the customer 12 in a capsule 40, and then she opens the cap 54 or 54' of that return transmission tube 56 or 56' and places the capsule 40 in that tube 56 or 56' for pneumatic dispatch back to the corresponding customer 12 who is located at that corresponding remote station 10–I or 10–II. The tubes 56 and 56' each have an initial portion having a downward slope, so that the capsule 40 begins its return journey again by gravity. Additional sensing and activating means 53 and 53' like the plunger 43 and switch 44 in tube 42, may also be provided near the open ends of tubes 56 and 56' at the operative station 18, to activate the pneumatic means 51 when a capsule 40 is dropped therein to cause the capsule 40 to return to the customer station 10.

Still observing FIG. 5, it will be noted that the operator station is provided with one or more rack 58, 58' in which may be kept extra deposit slips and other transaction forms. Separate control panels 60 and 60' are provided for each customer Station I and II, to control the volume, light intensity, and other features of the visual and audio communication system for each remote Station I and II. A bin 62 for the storage of extra capsules 40; and other storage means such as the cash drawers 64 also may be a part of the operation station 18. Thus, no cash or other valuables are kept at the remote customer station 10, and all records are kept at the operator station 18 interior of the bank.

Turning now back to FIG. 3, it is noticed that the return tube 56 for this Station I is directed upwardly as it enters the closed interior portion 47 of the customer station 10. A capsule 40, having moved back to the customer station 10 through this return tube 56, has a momentum which moves the capsule upwardly from the discharging or delivery end of tube 56. The capsule 40 is then deflected by deflector plates 66, which are arcuately formed to direct the capsule toward and into the above-described capsule receiver box 38. At the junction of this box 38 there may be provided capsule directing, stop and/or cushioning pads 67 and 68. One of these pads 67 may be provided on the inside of the smaller radius or inner deflector plate 66 opposite the door 36, in order to reduce the shock in any rebound of the capsule 40 when it drops into the box 38. Similarly, another pad 68 (see also FIG. 4) is provided inside the door 36, opposite the pad 67, to reduce the shock of the capsule against the back of the door 36 and its hinge mechanism. These pads 67 and 68 may be made of sponge rubber or other resilient type of material, and preferably are covered with a smooth flexible material to reduce friction with the capsule 40, so as to not restrict the free fall of the capsule 40 into the box 38, in the event it does not come around between the deflector plates 66 with too much force, as may be the case if the remote station 10 is too far away from the air supply or source of the pneumatic power for moving the capsule 40 through the return transmission tube 56 or 56'.

When the capsule 40 comes to rest in the box or receptacle 38 as shown in FIG. 3, it awaits this location until the door 36 is opened either by the customer 12, or by the operator 20 through one of the controls in panel 60 or 60' to operate the solenoid 46. Then the capsule 40 may be removed by the customer 12 and/or placed into the open end 42 of the return tube. In the event the operator 20 of the bank wishes to know whether or not a capsule 40 is located in the box 38 at a given remote station 10, there may be provided at each remote station 10, a photoelectric cell 70 and electric light 71 sensing means for providing a light beam which shines through aligned apertures 72 in the sides of the box 38 (see FIG. 4) so that when the light beam between the cell 70 and light 71 is obstructed, an indicator light 74 or 74' may be lighted at the operator station 18 in the bank, so that the operator 20 can determine if a capsule 40 is in that box 38.

Figure 2:
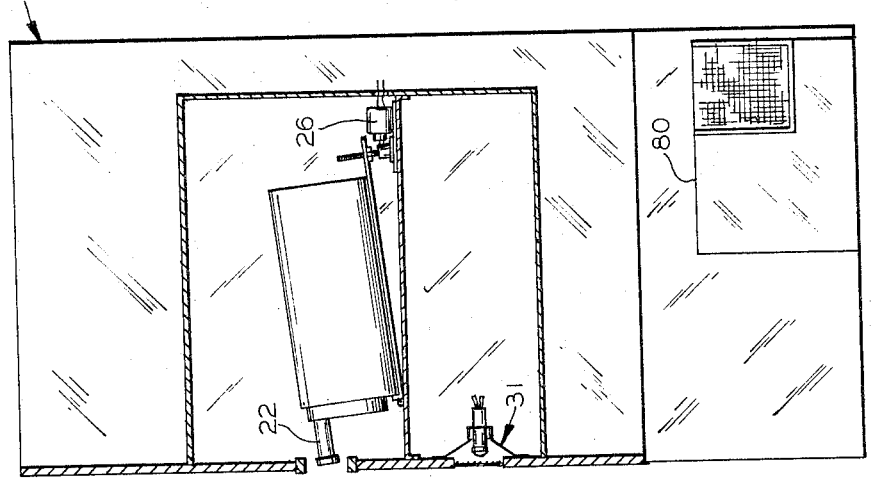
FIG. 2 is a sectional view of the customer station shown in FIG. 1 taken generally along the line II—II thereof.

Means for heating and air-conditioning the customer station are schematically illustrated in FIG. 2 by a control unit 80 for controlling the temperature and humidity of the customer station 10 for better operation of its various electronic components therein, particularly on hot days.

Adjacent the top of the customer station 10, there is provided a slot 90 through which a protective screen 92 is extendible to protect the face of the customer station 10 after business hours. This screen 92 also may be extended and retracted by another one of the control knobs on the panels 60 and 60' in the bank, corresponding to each customer station.

Although we have illustrated only a single customer station 10 and a dual teller station 18, for brevity, it may be desirable to provide a plural arrangement of such customer stations, with a corresponding number of operator stations to provide service therefor, utilizing basic concepts herein set forth.

Other equipment may be incorporated with the system of this invention, such as a parking lot television scanner 100 (see FIG. 1) by which an operator or teller on duty can become aware of a busy period for other service-islands which can be brought into use; and when the operator observes such a situation, he or she may summon other operators to come to teller duty at her multi-station panel or other panels, from other duty in the bank, further achieving personnel efficiency and rapid customer service.

It will thus be seen from the foregoing description of our invention (according to the illustrated embodiment, considered with the accompanying drawings), that the present invention provides a novel and advantageous service facilities and equipment, having many desired advantages and characteristics, including: the improved productivity and efficiency of personnel; greater variety of services conveniently achieved; improved customer relations and identifications; greater security; and the like; and that this invention accomplishes its intended objects, including those herein before pointed out and others which are inherent in the invention.

While there is described above the principles of this invention in connection with specific apparatus, it is to be clearly understood that this description is made only by way of example and not as a limitation to the scope of this invention.

What is claimed is:

1. A pneumatic dispatch system comprising:
   (A) two stations connected by two pneumatic transmission tubes between said stations, one tube for moving capsules in one direction and the other tube for moving capsules in the opposite direction,
   (B) a capsule movable through said tubes between said stations,
   (C) a chamber at at least one station connected to the delivering end of one of said tubes and the dispatching end of the other of said tubes,
   (D) means at said one station for removing said capsule from said chamber, said capsule removing means comprising:
      (a) a receptacle in said chamber for receiving said capsule from said delivering end of said tube,
      (b) a door in said chamber attached to said receptacle,
      (c) an electrically controlled means for actuating said door, and
      (d) a senser means in said dispatching end of said tube for operating said actuating means to close said door when said capsule is placed and released in said distpatching end of said tube.

2. A system according to claim 1 wherein said actuating means also includes means for controlling said pneumatic means.

3. A system according to claim 1 wherein said actuating means comprises a solenoid, and said sensing means comprises an electric switch means.

4. A system according to claim 1 wherein said sensing means comprises a plunger means extending into said tube means for contact by said capsule.

5. A system according to claim 1 including means to detect the presence of said capsule in said receptacle.

6. A system according to claim 5 wherein said detection means includes photoelectric cell means at said one station, and indicator means at the other station.

7. A system according to claim 1 including means adjacent said receptacle for cushioning the entry of said capsule into said receptacle.

8. A system according to claim 7 wherein said cushioning means is located in said receptacle.

9. A system according to claim 7 wherein said cushioning means comprise a resilient material having a smooth flexible outer surface.

10. A system according to claim 1 including a television camera and receiver means at both said stations for presenting to a patron the image of an operator and to the operator an image of the patron, means for adjusting the angular position of said camera at said patron station, and means in the operator station controllable by the operator for controlling said camera adjusting means at the patron station for scanning of the patron area for better viewing of the actions of the patron.

11. A facility according to claim 10 wherein said patron station is provided with a protective screen extendable to protect the face of the patron station and retractable to uncover the face of said station.

12. A facility according to claim 10 including an additional scanning television camera mounted remote from the operator station for scanning the approach to a patron station.

13. A facility according to claim 10 wherein said patron station includes means for conditioning the air temperature therein for the better operation of the television means at said patron station.

References Cited by the Examiner
UNITED STATES PATENTS

| | | | |
|---|---|---|---|
| 726,072 | 4/1903 | Koenig | 243—23 |
| 943,329 | 12/1909 | Wolever | 243—23 X |
| 1,069,062 | 7/1913 | Herz | 243—28 |
| 1,769,676 | 7/1930 | Cowley | 243—19 |
| 1,833,873 | 11/1931 | Jennings | 243—19 |
| 1,972,272 | 9/1934 | Needham | 243—19 |
| 2,776,090 | 1/1957 | Wright | 232—44 |
| 2,901,122 | 8/1959 | Edman | 312—297 X |
| 2,912,066 | 11/1959 | Ellithorpe | 243—2 |

SAMUEL F. COLEMAN, *Primary Examiner.*